(12) United States Patent
Bergshoeff (10) Patent No.: US 11,774,028 B2
(45) Date of Patent: Oct. 3, 2023

(54) INTERCHANGEABLE SEAL HEAD SYSTEM

(71) Applicant: Quest Integrity Group, LLC, Sugar Land, TX (US)

(72) Inventor: Nicolaas Dirk Bergshoeff, Sugar Land, TX (US)

(73) Assignee: QUEST INTEGRITY GROUP, LLC, Stafford, TX (US)

( * ) Notice: Subject to any disclaimer, the term of this patent is extended or adjusted under 35 U.S.C. 154(b) by 221 days.

(21) Appl. No.: 17/179,397

(22) Filed: Feb. 18, 2021

(65) Prior Publication Data

US 2021/0254829 A1    Aug. 19, 2021

Related U.S. Application Data

(60) Provisional application No. 62/978,651, filed on Feb. 19, 2020.

(51) Int. Cl.
| | | |
|---|---|---|
| *F16L 55/46* | (2006.01) | |
| *F23J 3/02* | (2006.01) | |
| *F23J 13/04* | (2006.01) | |
| *F16L 55/26* | (2006.01) | |
| *F16L 55/28* | (2006.01) | |

(52) U.S. Cl.
CPC ............... *F16L 55/46* (2013.01); *F23J 3/02* (2013.01); *F16L 55/26* (2013.01); *F16L 55/265* (2013.01); *F16L 55/28* (2013.01); *F23J 13/04* (2013.01)

(58) Field of Classification Search
CPC ..... F23J 13/04; F23J 3/02; F16L 55/46; F16L 55/26; F16L 55/265; F16L 55/28

USPC ............................................................ 431/3
See application file for complete search history.

(56) References Cited

U.S. PATENT DOCUMENTS

| | | | | |
|---|---|---|---|---|
| 313,342 | A | * | 3/1885 | Kingsland ................ F23J 13/04 |
| | | | | 285/206 |
| 2,855,759 | A | * | 10/1958 | Chaiser .................. F02M 21/00 |
| | | | | 62/50.7 |
| 8,733,187 | B2 | | 5/2014 | Loftstrom |
| 2008/0202594 | A1 | * | 8/2008 | Krywitsky ............. F16K 31/52 |
| | | | | 137/15.07 |
| 2012/0291939 | A1 | | 11/2012 | Warren et al. |
| 2013/0276558 | A1 | * | 10/2013 | Lofstrom ................ F16L 55/46 |
| | | | | 73/866.5 |

FOREIGN PATENT DOCUMENTS

| | | | |
|---|---|---|---|
| BR | 202015019725 U2 * | 7/2016 | |
| EP | 3543585 A1 | 9/2019 | |
| JP | S61165597 A | 7/1986 | |
| KR | 10-2017-0099203 A | 8/2017 | |
| WO | 2013030353 A1 | 3/2013 | |

OTHER PUBLICATIONS

BR 202015019725 U2 Translation (Year: 2016).*
International Search Report and Written Opinion in application PCT/US2020/018837 dated Apr. 29, 2020.

* cited by examiner

*Primary Examiner* — Steven B McAllister
*Assistant Examiner* — Benjamin W Johnson
(74) *Attorney, Agent, or Firm* — Patterson + Sheridan, LLP (57) ABSTRACT

An interchangeable seal head system and method for connecting and disconnecting a tube coupler on a header delivery system is described.

13 Claims, 9 Drawing Sheets

INTERCHANGEABLE SEAL HEAD SYSTEM

PRIOR RELATED APPLICATIONS

This application claims priority to U.S. Provisional Application No. 62/978,651, filed Feb. 19, 2020, which is incorporated by reference in its entirety for all purposes.

FIELD OF INVENTION

In general, the disclosure describes a system and methodology for an interchangeable seal head system for a header delivery system.

BACKGROUND OF INVENTION

Pigging of pipes or pipelines is performed to remove internal fouling, to inspect for defects in a pipe or to map the geographic location of the pipe. Pigging is done by pumping a device, i.e. a pig, through a pipe. Intelligent pigs have sensors that can record information on the condition of the pipe.

One example use of pigs is in cleaning fired heaters that are used in industries such as power and oil and gas. Fired heaters are typically insulated enclosures that use heat created by the combustion of fuels to heat fluids contained within coils, tubes, pipes, or the like. The type of fired heater is generally described by the structural configuration, the radiant tube coil configuration and the burner arrangement.

Over time, the internal coils/tubes/pipes of the fired heater are subject to pollution and wear during their work cycle. The internal coils/tubes/pipes may become internally fouled with coke. Coke is ash made of carbon fragments that lays down and coats the interior of the coils/tubes/pipes. Coke deposits drop out of the process stream if/when the stream gets too hot and starts to thermally degrade. Decoking is the industry term used to describe the process of removing coke or other types of internal fouling from a fired heater's inner pipes/tubes/coils. Presently, decoking is done by the use of conveying cleaning pigs through the pipes/tubes/coils.

When cleaning or inspecting furnaces, the furnaces may contain one or more manifolds, or header pipes. A header pipe has process tubes connected to the header pipe at one or more angular positions around the header pipe. To enable the pigging company to perform an operation to clean or inspect the furnace, there needs to be a temporary header delivery system (HDS) installed in the header pipes to access one or more process tubes. In many cases, this is a custom build hydraulic apparatus that is placed inside the header pipe. The header delivery system has a tube coupler and a bumper connected to a base assembly and configured to sealingly couple the tube coupler to a process tube. The tube coupler and the bumper each may be referred to as a seal head. Header delivery systems are often custom built for a customer and have a fixed tube coupler that may only be used for one size of header pipes.

What is needed, therefore, is an interchangeable seal head system for rapidly connecting and disconnecting the tube coupler and the bumper from the base assembly.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limited the scope of the claimed subject matter.

In one aspect of this disclosure, an interchangeable seal head system for a header delivery system is provided, the system comprising: a tube coupler; one or more lock members attached to the tube coupler; a mounting plate; and one or more setting members positionable between a retracted position and an extended position; wherein the one ore more setting members, when positioned in their extended position, are adapted to engage the one or more lock members to affix the tube coupler to the mounting plate.

In another aspect of this disclosure, an interchangeable seal head system for a header delivery system is described, comprising: a tube coupler; a lock member attached to the tube coupler; a mounting plate having a fastener hole section and a lock channel; a set screw extending through the lock channel; wherein the set screw is positionable between an extended position and a retracted position; wherein the set screw locks the lock member in the fastener hole section when in the extended position to lock the tube coupler on the mounting plate; and wherein the set screw unlocks the lock member in the fastener hole section when in the retracted position to allow the locking member to be removed from the fastener hole section and the tube coupler disconnected from the mounting plate.

In yet another aspect of this disclosure, a method of connecting and disconnecting a tube coupler from a header delivery system including the interchangeable seal head system is described, comprising: positioning the one or more setting members in their extended position such that they engage the one or more lock members to connect the tube coupler to the mounting plate; and positioning the one or more setting members in their retracted position such that they release the one or more lock members to disconnect the tube coupler from the mounting plate.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. As used herein, the terms "coils", "pipes", and "tubes" are used individually or in combination to mean fluid carrying elements such as those of a fired heater.

The present disclosure generally relates to an interchangeable seal head system and method for rapidly changing a tube coupler and a bumper of a header delivery system. Tube couplers and bumpers of varying sizes using an interchangeable seal head system may be connected to a header delivery system and disconnected from the header delivery system. Tube couplers and bumpers may be referred to as seal heads. The ability to rapidly connect and disconnect tube couplers and bumpers helps address the cost and time inefficiencies of using a custom header delivery system with fixed tube couplers and bumpers. A header delivery system equipped with the interchangeable seal head system may be usable with different sized header systems having header pipes and process tubes by selecting a tube coupler and bumper sized for the header system. In this manner interchangeable seal head system of the present disclosure enables a header delivery system to be used on header systems of different sizes. In other words, seal heads of the header delivery system are modular and may be replaced with different seal heads that may be in a variety of shapes or sizes to accommodate header pipes and connected process pipes of different sizes. By adding different sized and shaped seal heads to the header delivery system, the header delivery system of the present disclosure can accommodate a wide range of sizes of header pipes and process tubes, and thus be adjusted as needed to perform pigging services for a furnace requiring a service operation.

The header delivery system of the present disclosure enables quick response to perform pigging operations as the need to custom build a header delivery system may be eliminated. The response time may be reduced from a couple of weeks of designing, manufacturing and testing the custom header delivery system to the amount of time needed to send the universal header delivery system to location.

Figure 1:
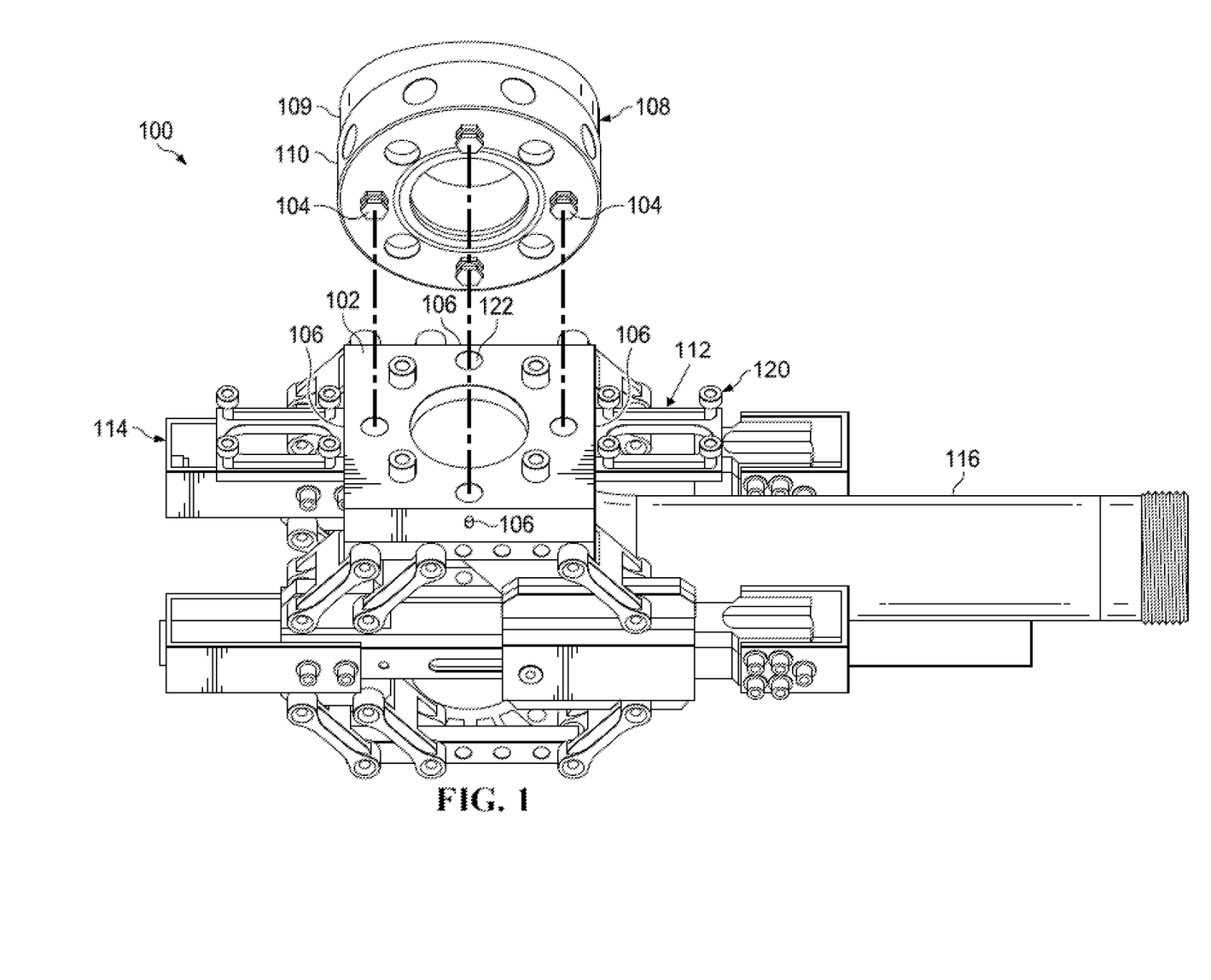
FIG. 1 is a perspective view of the interchangeable seal head system in a disconnected position with the header delivery system according to embodiments of the present disclosure.

Referring to FIG. 1, an interchangeable seal head system formed by a mounting plate 102, lock members 104, set members 106 and a tube coupler 108 is shown. The interchangeable seal head system is part of a header delivery system 100. Header delivery system 100 includes a base assembly 112 having a frame apparatus 114 and a launcher pipe 116. Bolts 120 may be used to connect the first mounting plate 102 to the frame apparatus 114. In some embodiments, first mounting plate 102 may form a portion of the frame apparatus 114. In some embodiments, lock members 104 may be bolts and set members 106 may be set screws. Tube coupler 108 may be connected to the first mounting plate 102 to be sealingly coupled to the launcher pipe 116. FIG. 1 shows the tube coupler 108 separated from the first mounting plate 102 in a disconnected position. Tube coupler 108 may have a seal portion 109 and tube plate 110 positioned at a bottom surface of the tube coupler 108.

Lock members 104 may be connected to a bottom surface of the tube coupler 108 and extend therefrom. Four lock members 104 are shown connected to the tube coupler 108 in the embodiment shown in FIG. 1. In alternate embodiments of the present disclosure, the number of lock members 104 may be varied depending on the specific application.

Figure 2:
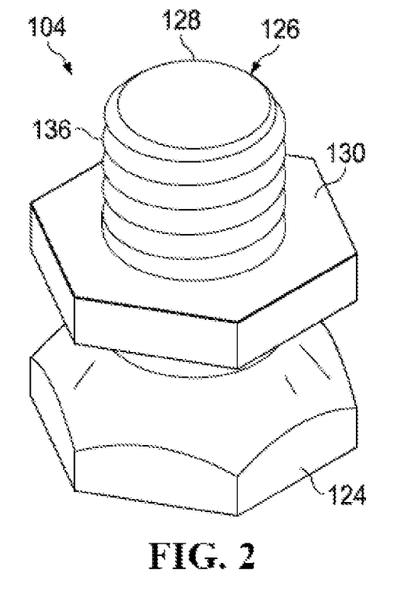
FIG. 2 is a perspective view of a lock fastener of the interchangeable seal head system according to embodiments of the present disclosure.
Figure 3:
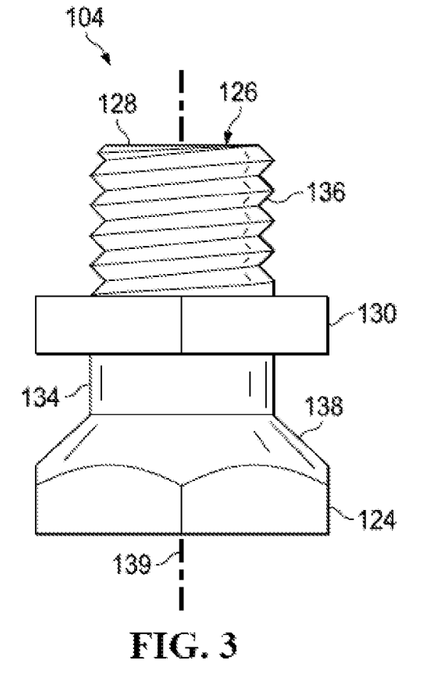
FIG. 3 is a side view of the lock fastener of the interchangeable seal head system according to embodiments of the present disclosure.

Each lock member 104 has a fastener head 124, shown in FIGS. 2-3, configured to fit in a fastener opening 122 formed in the first mounting plate 102. Each lock member 104 has a fastener shaft 126 configured to fit in a tube hole section of the tube coupler 108. Four fastener openings 122 on the first mounting plate 102 are shown in FIG. 1.

In some embodiments, the tube coupler 108 may have a curved outer surface. Tube coupler 108 may be configured to conform to a curved surface of the inner diameter of a header pipe or manifold. In some embodiments, the tube coupler 108 may have a curved outer surface of a different radius or a flat outer surface configured to conform to the internal surface of the header pipe. In some embodiments, the tube coupler 108 may be made of a resilient material configured to form a seal to a process tube coupled to the header pipe.

Referring to FIG. 2 and FIG. 3, each lock member 104 has a fastener flange 130 connected between the fastener head 124 and a shaft end 128. Each fastener shaft 126 is configured to connect in a tube hole section of the tube coupler 108. Fastener shaft 126 has a first shaft section 134 extending between the fastener head 124 and the fastener flange 130. Fastener shaft 126 also has a second shaft section 136 extending between the fastener flange 130 and the fastener end 128. In one embodiment, the lock member 104 is attached to the tube coupler 108 through threading. The second shaft section 136 may therefore have screw threads configured to connect the lock member 104 to the bottom of a tube coupler 108. A tube hole section of the tube coupler 108 may have mating threads that mate with the screw threads of the second shaft section 136. Fastener head 124 has a first head surface 138 that has a wedge shape. First head surface 138 is at an angle to a first axis 139. The angled first head surface allows the set member 106 to engage with the lock member 104, thereby securing the tube coupler 108 in place, as further described below with regard to FIG. 7.

Figure 4:
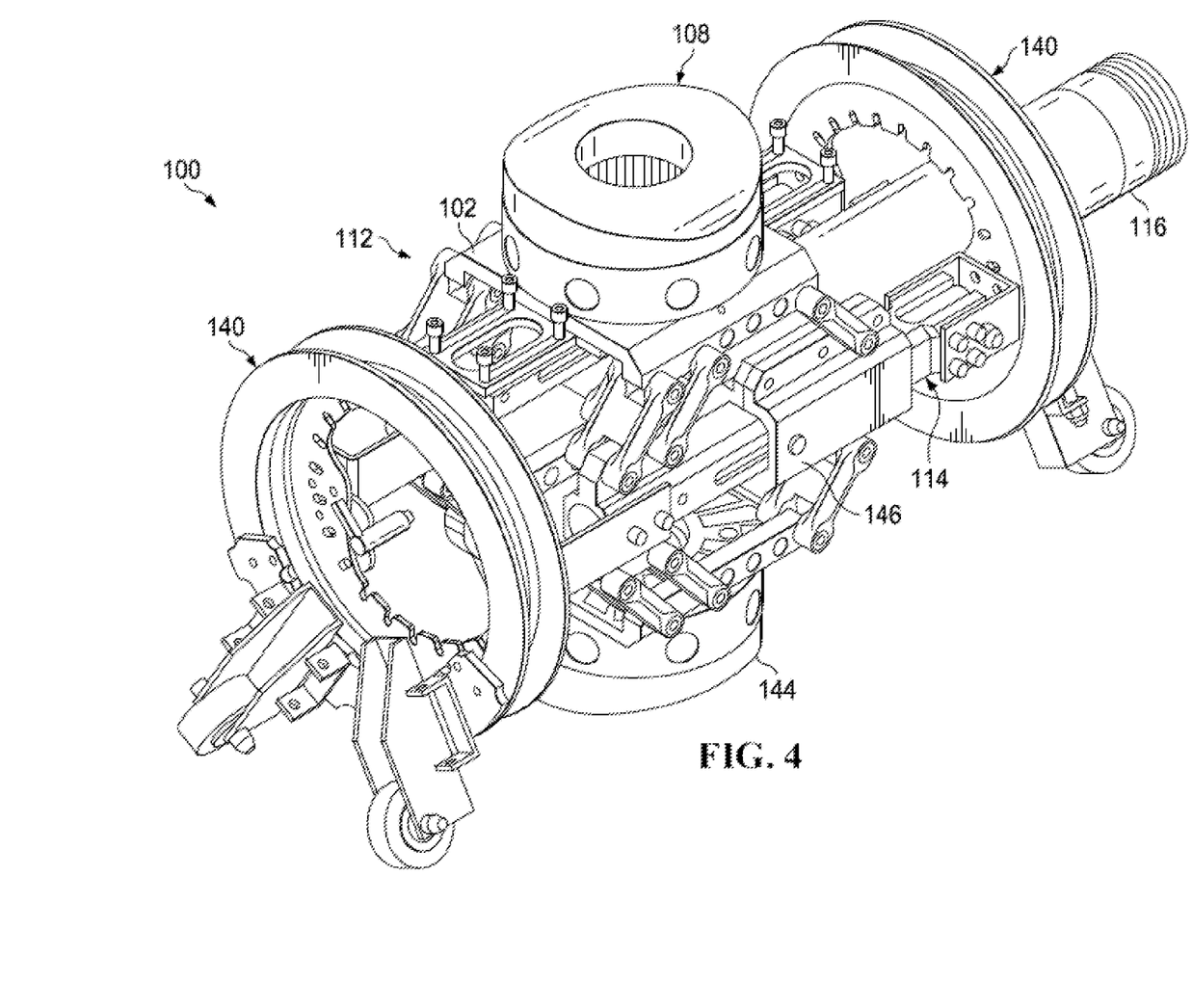
FIG. 4 is a perspective view of an interchangeable seal head system in a connected position on a header delivery system according to embodiments of the present disclosure.
Figure 5:
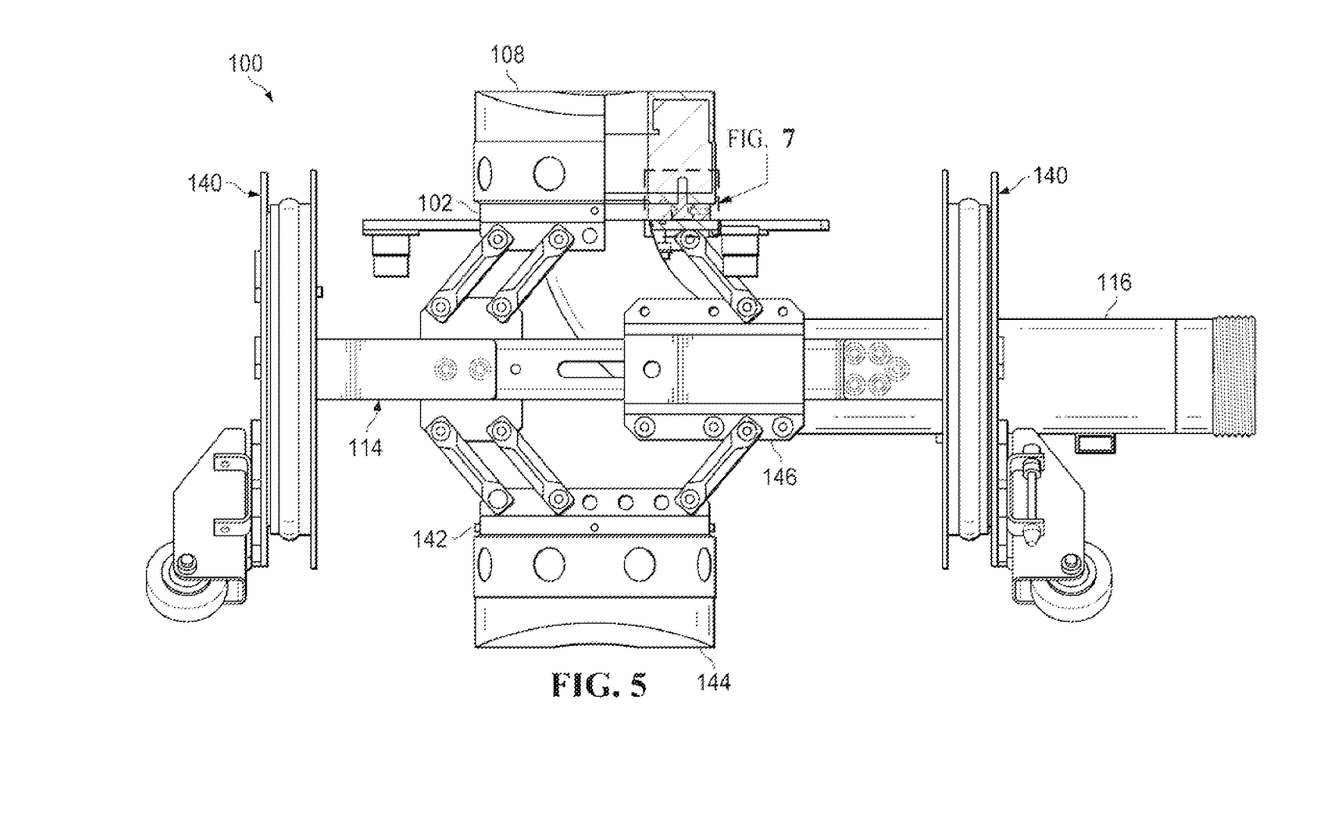
FIG. 5 is a side view of the interchangeable seal head system in the connected position on the header delivery system and showing a cross-sectional view of a lock assembly according to embodiments of the present disclosure.

Referring to FIG. 4 and FIG. 5, the tube coupler 108 is shown connected to the mounting plate 102 in a connected position. Header delivery system 100 has a rotation assembly 140 for rotating the base assembly 102 to position the base assembly 112 at a selected angular position with respect to the rotation assembly 140. Header delivery system 100 has a second mounting plate 142 connected to the frame apparatus 114. The mechanism between the lock member 104, the set member 106, and the tube coupler 108 will be described in more detail with regard to FIG. 7 below.

A bumper 144 is connected to the second mounting plate 142, where the bumper 144 and the tube coupler 108 are disposed on opposite sides of the frame apparatus 114. A hydraulic jack apparatus 146 positions the tube coupler 108 and the bumper 144 between a retracted position and an extended position when the header delivery system 100 is in a header pipe. Jack apparatus 146 may be used to position the tube coupler 108 and bumper 144 from a retracted position to an extended position to form a seal between the tube coupler 108 and a process tube connected to the header pipe.

In embodiments of the present disclosure, bumper 144 may be formed by a tube coupler that is similar, or identical, to the tube coupler 108. Using a bumper 144 that is similar, or identical, to the tube coupler 108 has the benefit of reducing the number of different parts used for the header delivery system 100.

An interchangeable seal head system may be used for the bumper 144. Interchangeable seal head system for the bumper 144 may be identical to embodiments of the interchangeable seal head system disclosed to position the tube coupler 108 between the connected position and the disconnected position. The interchangeable seal head system for the bumper 144 is formed by the second mounting plate 142, lock members 104, and set members 106.

Figure 6:
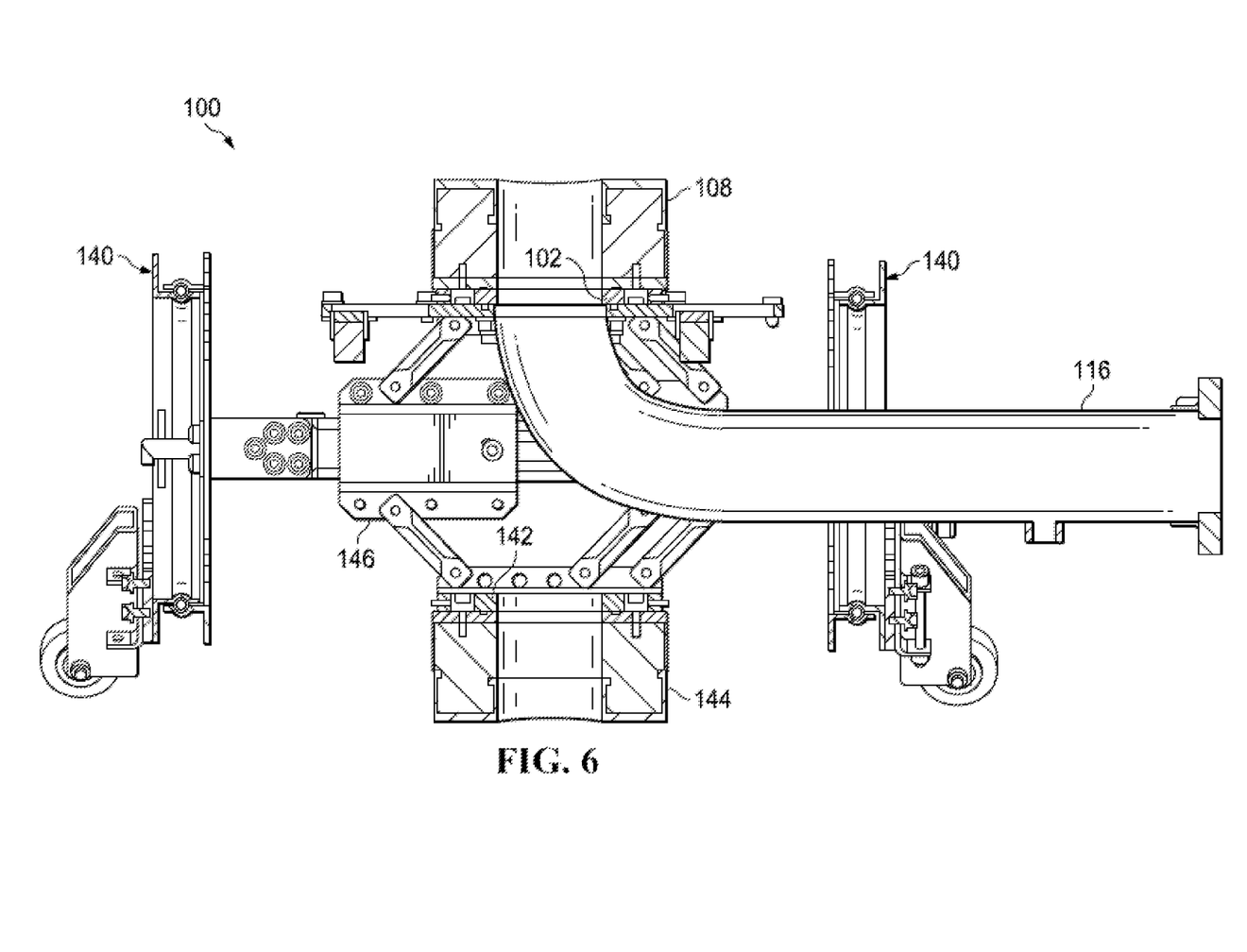
FIG. 6 is cross-sectional side view of the interchangeable seal head system in the connected position on the header delivery system according to embodiments of the present disclosure.

Referring to FIG. 6, which shows a cross-section of the header delivery system 100, where a portion of the tube coupler 108 is connected to the first mounting plate 102, and once connected, a continuous fluid channel is formed between the tube coupler 108 and the launcher pipe 116.

Figure 7:
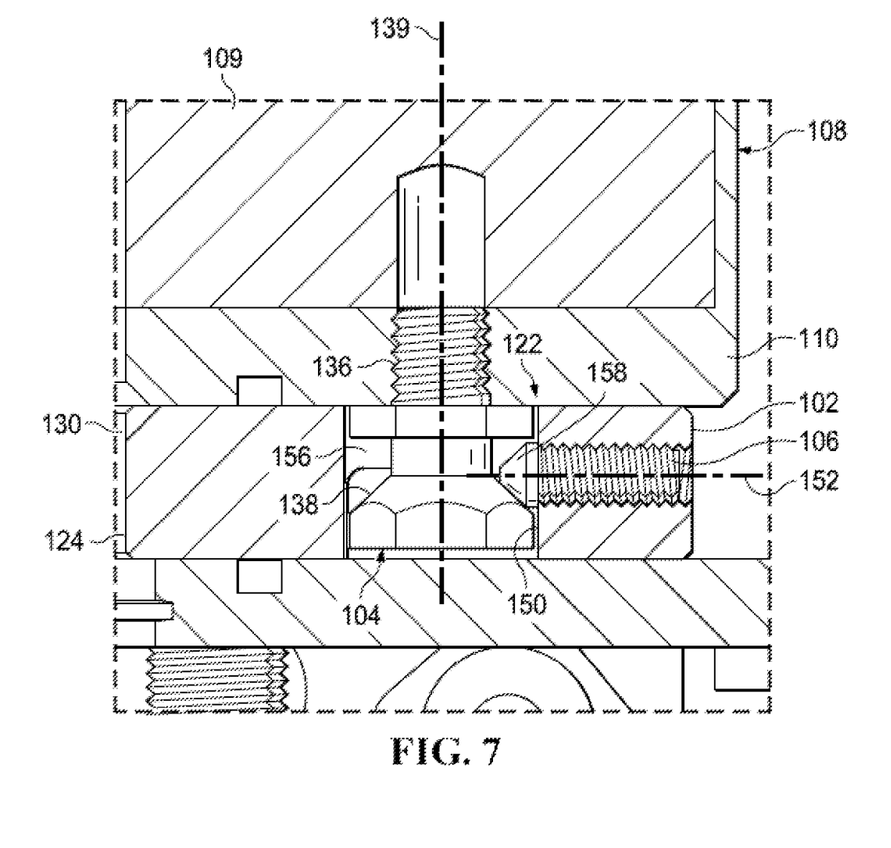
FIG. 7 is an enlarged view of the lock assembly of FIG. 5 showing the lock member in a locked position according to embodiments of the present disclosure.

Referring to FIG. 7, interchangeable seal head system is shown with the tube coupler 108 connected to the first mounting plate 102. Second shaft section 136 extends into the tube plate 110 and may be connected using mating screw threads. First mounting plate 102 has a fastener hole section 150 forming the fastener opening 122. In one embodiment, the fastener head 124 is sized to fit in the fastener opening 122 and may be extended past an external lip 156 that extends from a side wall of the fastener hole section 150. External lip 156 is disposed between a bottom section and the fastener opening 122 of the fastener hole section 150. Set member 106 may be positioned in a retracted position when the lock member 104 is inserted into the fastener hole section 150. In the retracted position, set member 106 may be retracted to not extend in the fastener hole section 150 and the fastener head 124 is sized to fit past the fastener flange 130 and in the bottom section of the fastener hole section 150.

With the fastener head 124 inserted in the bottom section of the fastener hole section 150, the set member 106 may be positioned from the retracted position to an extended position. In the extended position, the set member 106 has a first end 158, see also FIG. 9, that abuts against the first head surface 138 of the lock member 104. The first end of the lock member 104 and the first head surface 138, shown in FIG. 3, form a wedge force as the set member 106 is moved along a second axis 152 and against the first head surface 138. The set member 106 is adjusted along the second axis 152 to apply a first force against the first head surface 138 of the fastener head 124. The second axis 152 may be perpendicular to the first axis 139 extending through a center of the locking member 104. The first force of the set member 106 forces the locking member 104 downwards along the first axis 139 and in addition forces the locking member 104 towards external lip 156. The forces applied by the set member 106 applies a force to the lock member 104 to pulls the tube coupler 108 towards the first mounting plate 102. The set member (screw) 106 in the extended position positions the tube coupler 108 in the connected position.

Figure 8:
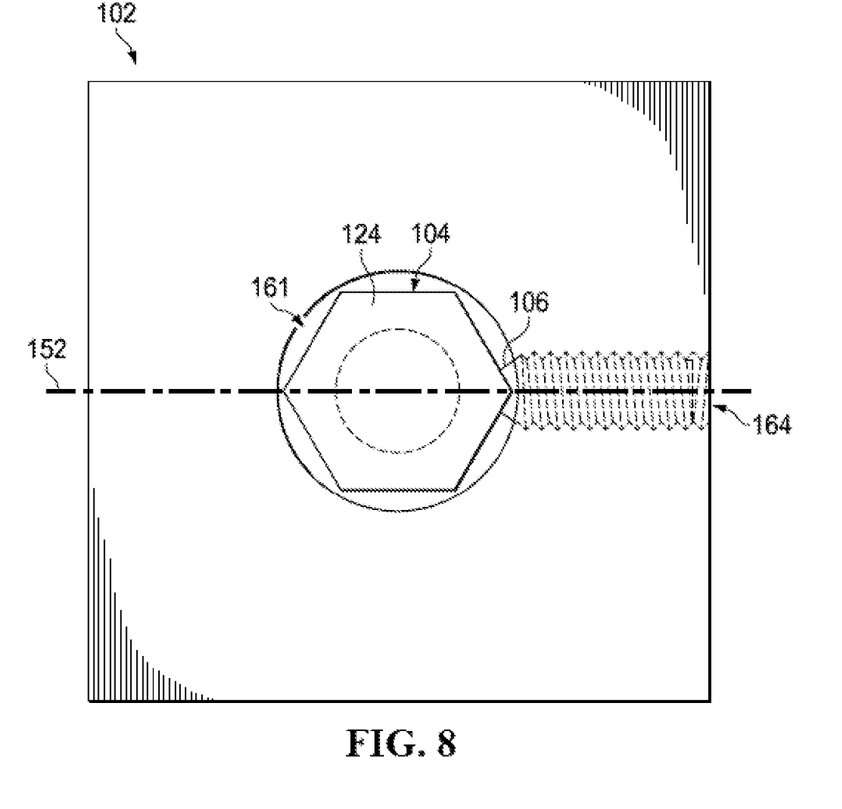
FIG. 8 is a bottom view of the lock member in a mounting plate according to embodiments of the present disclosure.
Figure 9:
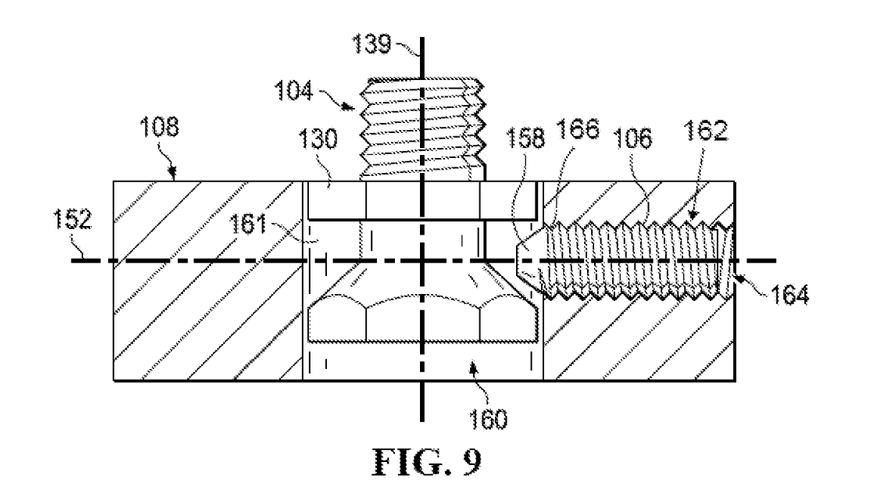
FIG. 9 is a side view of the lock member in a mounting plate according to embodiments of the present disclosure.
Figure 10:
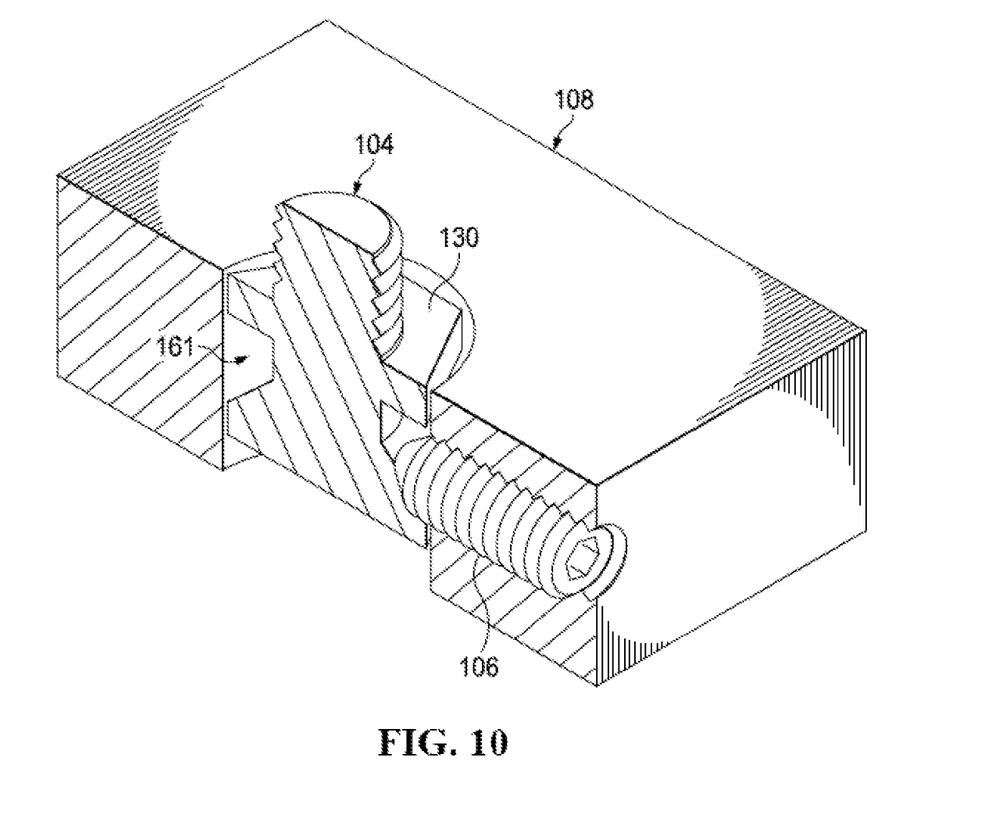
FIG. 10 is a perspective view of the lock member in a mounting plate according to embodiments of the present disclosure.

Referring to FIGS. 8-10, a lock member 104 is shown in the first mounting plate 102. Fastener head 124 is shown in a bottom section 160. Bottom section 160 is disposed below the fastener flange 130. Bottom section 160 may have a bottom section hole 161, as shown in FIG. 8. Set member 106 is shown extended in a lock channel 162 having a first channel opening 164 and a second channel opening 166. First end 158 of the lock member 104 is shown extending through the second channel opening 166 into the fastener hole section 150. A screw or other tool may be extended in the first channel opening 164 to rotate the set member 106 between the retracted position and the set position. In some embodiments, lock channel 162 may be a sideways threaded hole where the set member 106 may be a pointed hexagon socket set screw. In alternate embodiments, the set member 106 may be a spring actuated plunger or pin that engages the locking member 104.

Figure 11:
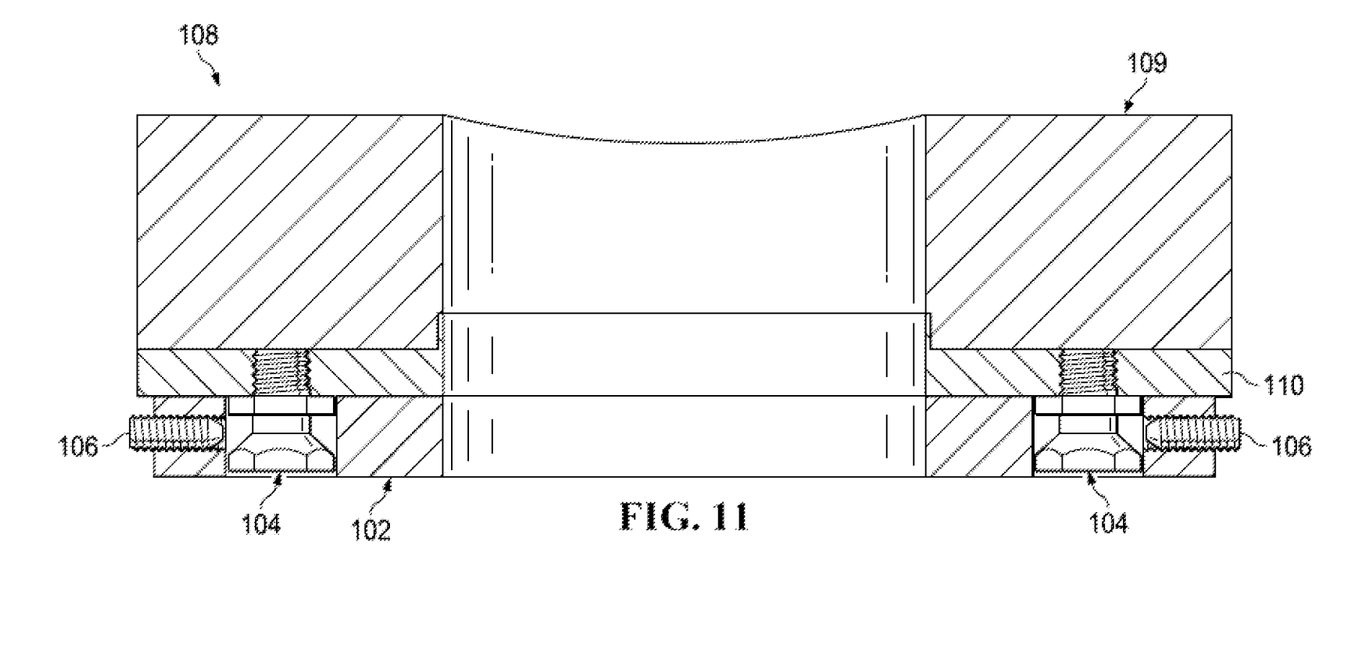
FIG. 11 is a cross-sectional view of the interchangeable seal head system according to embodiments of the present disclosure.

Referring to FIG. 11, a cross-section of the tube coupler 108 is shown being positioned in the connected position.

The set members 106 are shown in a retracted position. The set members 106 may be positioned to the extended position, shown in FIG. 7, where the set members 106 apply a force to the lock members 104 to secure the connection of the tube coupler 108 to the mounting plate 102 and frame apparatus 114, as shown in FIG. 2.

The interchangeable seal head system clamps the tube coupler and the bumper to the frame apparatus of a header delivery system in a connected position. The interchangeable seal head system allows a user to quickly position the tube coupler or other seal heads between a connected position and a disconnected position in order to quickly mount or change the tube coupler of the correct size. The set members are positioned in retracted positions to unlock the tube coupler from the mounting plate, and the tube coupler is lifted from the mounting plate. To securely engage the tube coupler to the mounting plate, the lock members are first positioned in the fastener hole section in the mounting plate, and the set members are driven in the extended positions to lock the tube coupler on the mounting plate. Set members are easily positioned between the retracted position and the extended position with a tool such as a screwdriver to allow for quick connection and disconnection of tube couplers.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An interchangeable seal head system for a header delivery system, comprising:
    a tube coupler;
    one or more lock members attached to the tube coupler;
    a mounting plate, wherein the mounting plate comprises one or more holes for receipt of the one or more lock members, and one or more locking channels that intersect the one or more holes; and
    one or more setting members positionable between a retracted position and an extended position;
    wherein the one or more setting members, when positioned in their extended position, extend from the one or more locking channels and engage the one or more lock members to affix the tube coupler to the mounting plate;
    wherein the one or more lock members have a threaded shaft section that is threaded into a bottom surface of the tube coupler;
    wherein each of the one or more lock members have a fastener flange and a fastener head located below the threaded shaft section, and wherein the fastener head has a first head surface that is at an angle to a longitudinal axis of the lock member.

2. The interchangeable seal head system of claim 1, wherein the one or more locking channels intersect the one or more holes at a perpendicular angle.

3. The interchangeable seal head system of claim 1, wherein the one or more setting members each have a first end that engages the first head surface of the one or more lock members, and wherein the first head surface has a wedge shape.

4. The interchangeable seal head system of claim 1, wherein the one or more setting members are set screws.

5. The interchangeable seal head system of claim 1, wherein the one or more setting members are spring actuated plungers.

6. The interchangeable seal head system of claim 1, further comprising a launcher pipe.

7. The interchangeable seal head system of claim 6, wherein the launcher pipe and the tube coupler are in fluid communication when the one or more setting members engage the one or more lock members.

8. The interchangeable seal head system of claim 1, wherein the one or more setting members engage the first head surface of the one or more lock members when in the extended position.

9. The interchangeable seal head system of claim 1, wherein the one or more setting members are threaded into the one or more locking channels such that they extend into the one or more holes and engage the one or more lock members when in the extended position.

10. An interchangeable seal head system for a header delivery system, comprising:
    a tube coupler;
    a lock member attached to the tube coupler;
    a mounting plate having a fastener hole section and a lock channel that intersects the fastener hole section; and
    a set screw extending through the lock channel;
    wherein the set screw is positionable between an extended position and a retracted position;
    wherein the set screw locks the lock member in the fastener hole section when in the extended position to lock the tube coupler on the mounting plate;
    wherein the set screw unlocks the lock member in the fastener hole section when in the retracted position to allow the locking member to be removed from the fastener hole section and the tube coupler to be disconnected from the mounting plate;
    wherein the lock member has a threaded shaft section that is threaded into a bottom surface of the tube coupler;
    wherein the lock member has a fastener flange and a fastener head located below the threaded shaft section, and wherein the fastener head has a first head surface that is at an angle to a longitudinal axis of the lock member.

11. The interchangeable seal head system of claim 10, wherein the lock member is attached to the tube coupler through threading.

12. The interchangeable seal head system of claim 10, wherein the fastener head of the lock member is sized to fit in the fastener hole section.

13. A method of connecting and disconnecting a tube coupler from a header delivery system including the interchangeable seal head system of claim 1, and comprising:
    positioning the one or more setting members in their extended position such that they engage the one or more lock members to connect the tube coupler to the mounting plate; and
    positioning the one or more setting members in their retracted position such that they release the one or more lock members to disconnect the tube coupler from the mounting plate.

* * * * *